Aug. 4, 1959 G. N. WILLIS ET AL 2,897,644
LUG INSERTING MACHINE
Filed Oct. 29, 1956 6 Sheets-Sheet 1

INVENTORS
GRANT N. WILLIS
LIONEL H. SECCOMBE, JR.
BY
*Lindsey and Prutzman*
ATTORNEYS Aug. 4, 1959
G. N. WILLIS ET AL
2,897,644
LUG INSERTING MACHINE
Filed Oct. 29, 1956
6 Sheets-Sheet 2
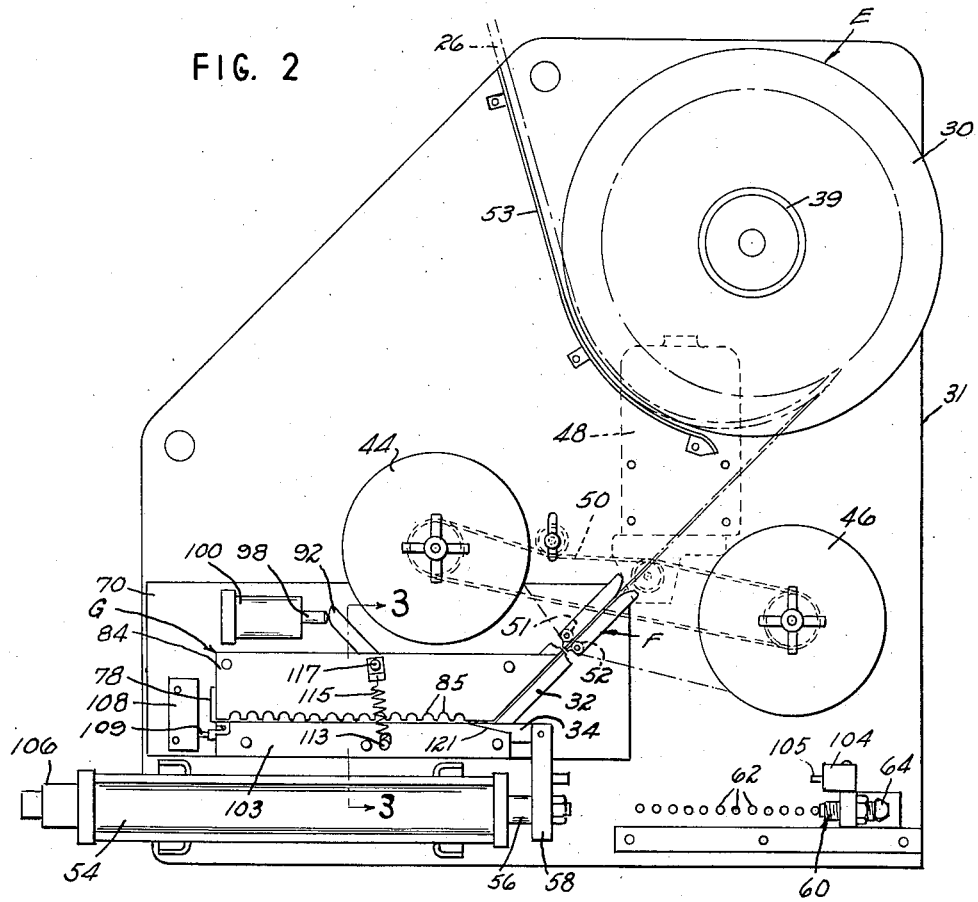
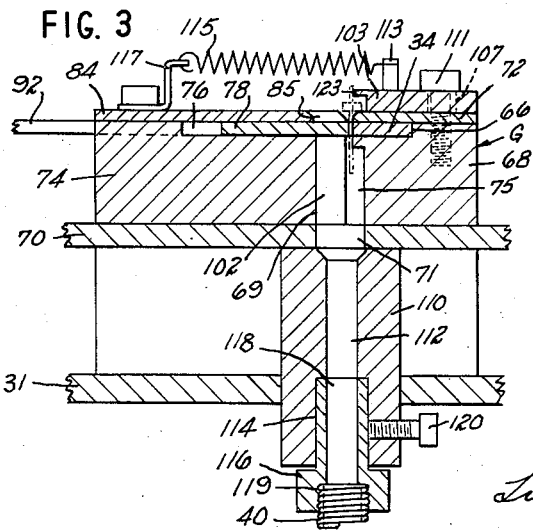
INVENTORS
GRANT N. WILLIS
BY LIONEL H. SECCOMBE, JR.
Lindsey and Prutzman
ATTORNEYS

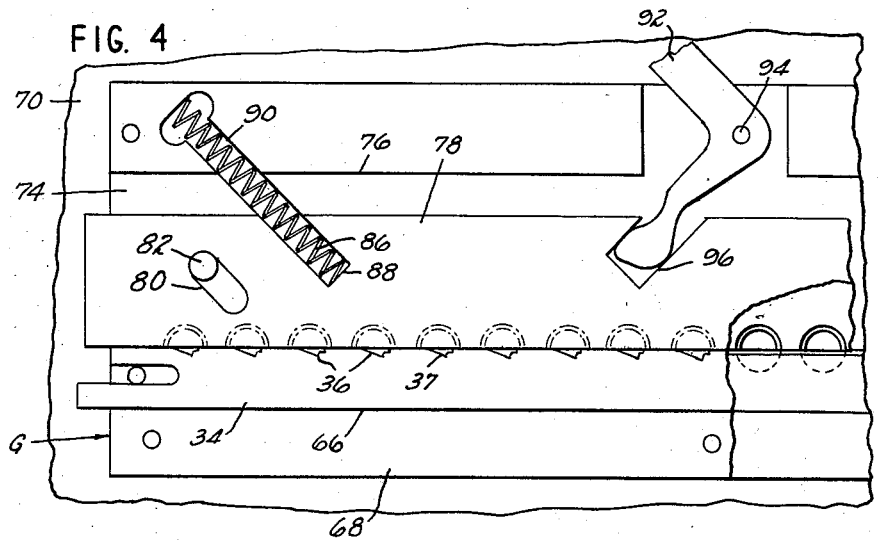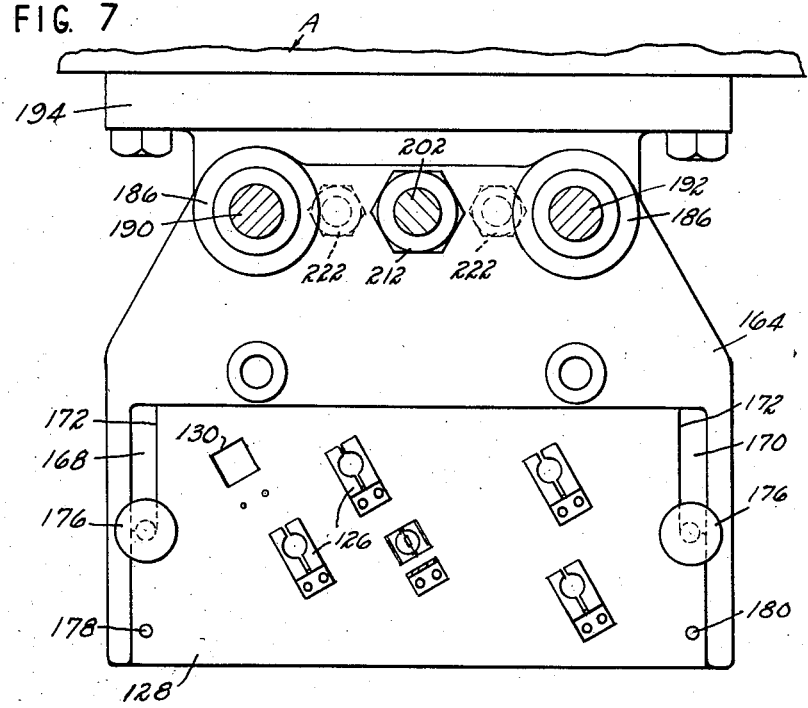

Aug. 4, 1959 G. N. WILLIS ET AL 2,897,644
LUG INSERTING MACHINE
Filed Oct. 29, 1956 6 Sheets-Sheet 4
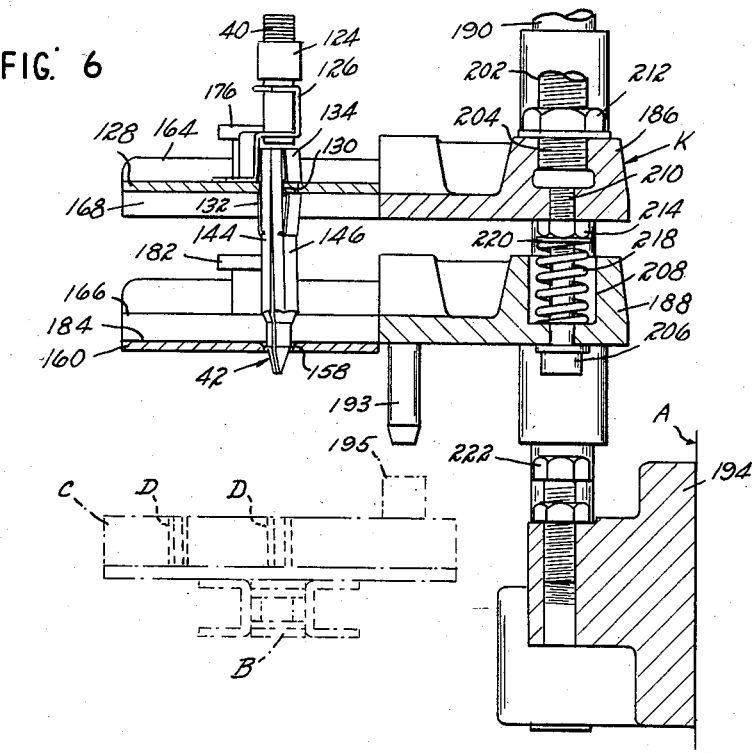
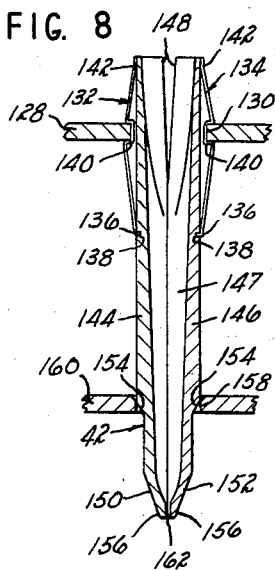
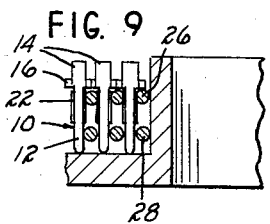
INVENTORS
GRANT N. WILLIS
BY LIONEL H. SECCOMBE, JR.
Lindsey and Prutzman
ATTORNEYS Aug. 4, 1959　　　G. N. WILLIS ET AL　　　2,897,644
LUG INSERTING MACHINE Filed Oct. 29, 1956　　　　　　　　　　　　　6 Sheets-Sheet 5

INVENTORS
GRANT N. WILLIS
LIONEL H. SECCOMBE, JR.
BY
*Lindsey and Prutzman*
ATTORNEYS Aug. 4, 1959  G. N. WILLIS ET AL  2,897,644
LUG INSERTING MACHINE Filed Oct. 29, 1956  6 Sheets-Sheet 6

INVENTORS
GRANT N. WILLIS
LIONEL H. SECCOMBE, JR.
BY
Lindsey and Prutzman
ATTORNEYS

United States Patent Office 2,897,644
Patented Aug. 4, 1959

2,897,644

LUG INSERTING MACHINE

Grant N. Willis and Lionel H. Seccombe, Jr., Bristol, Conn., assignors to Cinch Manufacturing Corporation, Chicago, Ill., a corporation of Illinois Application October 29, 1956, Serial No. 618,854

14 Claims. (Cl. 53—247)

This invention relates to a machine for automatically feeding and inserting lugs in panels and has particular application in the securing of electrical terminals or contacts to panels used in electrical equipment such as printed circuit panels, chassis members and the like.

In the manufacture of electronic equipment it is often necessary to attach a predetermined number of electrical contacts to a panel such as a printed circuit board in a predetermined geometrical pattern. It is the usual prectice to manually insert the terminals in the printed circuit board in the pattern dictated by any particular board which, of course, is undesirably time consuming and expensive.

Accordingly, it is an object of the present invention to provide a machine for automatically inserting a predetermined number of such contacts in an electrical panel in a predetermined geometric arrangement.

It is further an object of this invention to provide a contact inserting machine having means for the selective varying of the predetermined number of contacts to be inserted as desired for any particular operation.

It is further an object of this invention to provide an inserting machine of the type described whereby the said geometrical pattern in which the contacts are inserted may be varied as desired for any particular application.

It is yet another object of this invention to provide a contact inserting machine of the type described which is simple and relatively economical in construction, and capable of continuous trouble-free operation for long periods so as to therefore be particularly suitable for mass production usage.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 2 is a top view of the contact inserting machine of Fig. 1;

Fig. 3 is a fragmentary cross sectional view along the lines 3—3 of Fig. 2;

Fig. 4 is a fragmentary top view of the machine with portions of the machine removed;

Fig. 6 is a fragmentary side view partly in section of another portion of the machine;

Fig. 7 is a top view of the portion of the machine shown in Fig. 6;

Fig. 8 is a fragmentary elevational view in section of a portion of the machine shown in Fig. 6;

Fig. 9 is a fragmentary cross sectional view of a portion of the machine of Fig. 2 illustrating contacts of the type with which the present invention is concerned;

Figure 13:
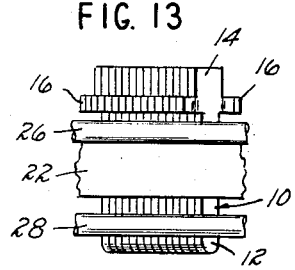
Fig. 13 is an elevational view of a group of stacked contacts as shown in Fig. 9.
Figure 14:
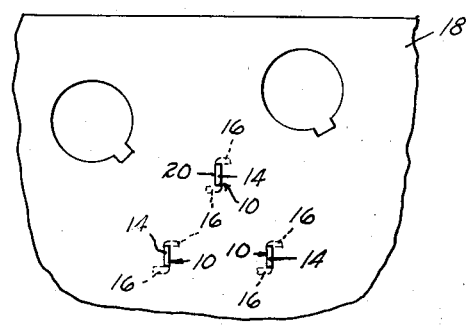
Fig. 14 is a fragmentary top view of an exemplary panel of the type to which the contact of Fig. 12 is adapted to be attached.

With reference to Figs. 9 and 12–14, an exemplary contact 10 of the type with which the present invention may be used is comprised of a one-piece sheet metal member having an elongated stem 12 and a broad head 14 of a length somewhat greater than a thickness of a panel to which it is to be attached. On the sides of the head adjacent its inner end extend lateral ears 16 which are bent in opposite directions at approximately right angles to the plane of the contact. The portion of the panel 18 shown in Fig. 14 is exemplary of a printed circuit panel for electronic equipment and includes openings for accommodating various circuit components such as tube sockets and the like, as well as a number of rectangular slots 20 located at particular points on the printed circuit and each dimensioned to receive the head 14 of a terminal 10. The contacts are adapted to be attached to the panel by inserting the head 14 of each into a slot 20 until its ears 16 abut the panel surface so as to support the stem of the contact in an upright position perpendicular to the panel and then staking the marginal side portions of the head over against the opposite surface of the panel so as to staple the contact therein in a rigid and mechanically secure manner. As of course is apparent, the number of slots 20 and their geometrical arrangement will vary depending upon the particular panel or chassis, etc., being produced.

To better understand the later description of a machine constructed in accordance with the present invention, it should be stated that it is contemplated that the terminals 10 will be supplied to the machine in an elongated row, a portion of which is shown in Fig. 13 with the terminals stacked together with their stems 12 side by side and with their ears 16 in nesting relation. The terminals are secured in assembled relationship shown in Fig. 13 by means of a flexible strip 22, such as pressure-sensitive tape, secured to the stems 12 of the terminals. As can be seen in Fig. 9 a flexible strip 22 is provided on both sides of the stems of the terminals. The contacts are preferably supplied in coiled form with spacer members 26 and 28 disposed between successive layers or rows of terminals in order to maintain the stems of the terminals in any one row or layer substantially vertical and parallel with successive rows of terminals as shown in Fig. 9. The spacer members 26 and 28 may be cord or any other welt suitable for the purpose intended.

In order that the detailed description which is to follow may be better understood, a general description of the mechanism of the machine and the mode of operation will here be given.

Figure 1:
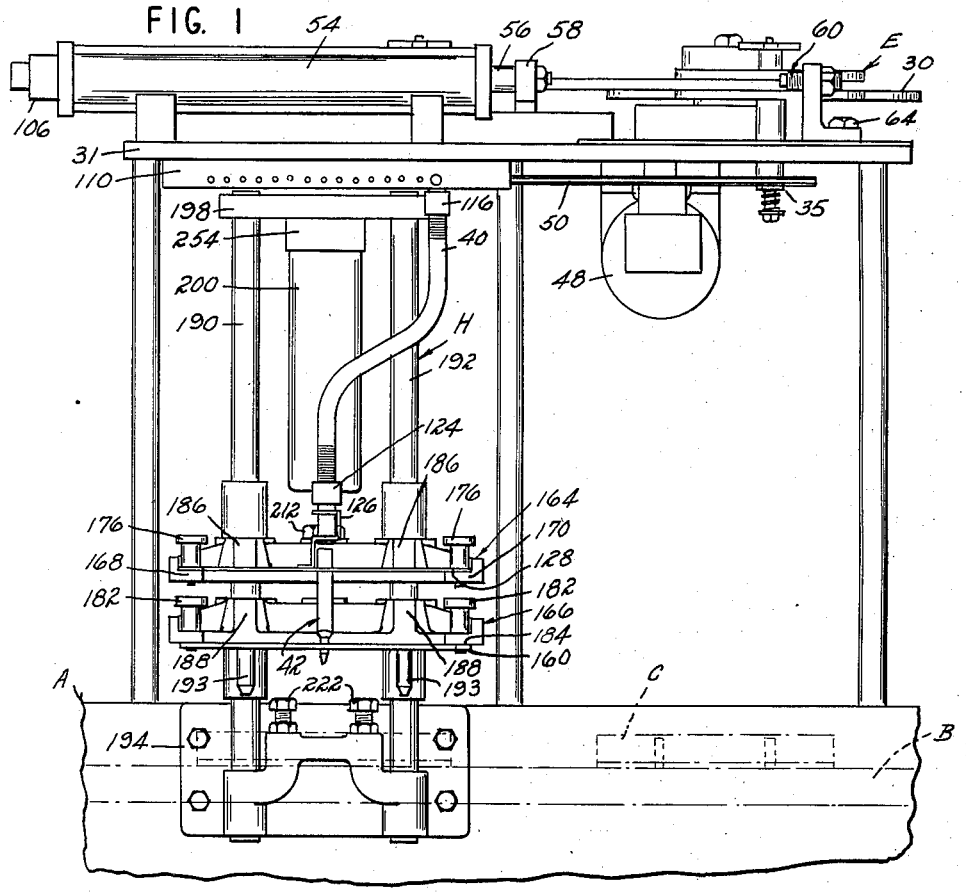
Fig. 1 is a front elevational view of a contact inserting machine constructed in accordance with the invention.

As can be seen in Figs. 1 and 2 the machine is adapted to be mounted on a table A disposed closely adjacent a chain conveyor B for advancing a plurality of fixtures C relative to the machine and to a punch, not shown.

Fixture C, as can be seen in Fig. 6 is provided with a plurality of bushings D for the reception of the stem of a terminal 10 with the ears of the terminal supported on the top of the bushing and with the head of the terminal extending upwardly. With the terminals in this position a printed circuit board such as shown at 18 in Fig. 14 may be placed thereover whereby the heads 14 of the terminals will extend upwardly through the slots 20 in the board in the manner shown in Fig. 14, to permit subsequent staking of the heads of the terminals to assemble the terminals and board.

The machine generally comprises a terminal supply portion E including a turntable 30 on which is placed a coil of terminals 10, such as hereinbefore described. The terminal supply portion E, by means to be more fully described hereinafter, maintains the lower portion 32 of a guide channel F filled with a stacked row of terminals arranged similarly to the terminals shown in Fig. 13 but from which the welt and tape have been previously automatically removed.

Figure 5:
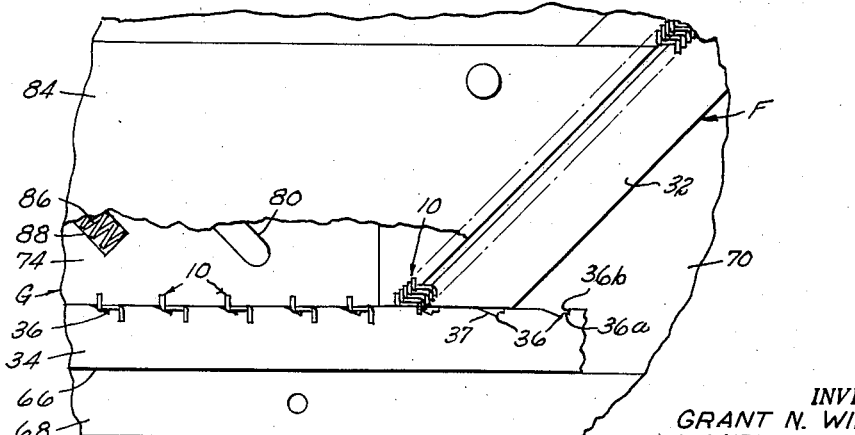
Fig. 5 is a fragmentary top view of the machine with portions of the machine removed.

A terminal selecting portion G comprising a reciprocable slide 34 having terminal receiving notches 36, as best shown in Fig. 5, transfers a predetermined number of terminals from the end of the lower portion 32 of the channel F into respective registry with a plurality of delivery stations represented by recesses 85, shown in Fig. 2, for simultaneous delivery into a plurality of tubes such as 40, which are connected with a plurality of nozzles such as 42 forming a part of the terminal inserting portion H of the machine. While only one nozzle 42 and tube 40 are shown, it is understood that usually there will be a plurality of such nozzles arranged in the geometric pattern dictated by the location of the slots 20 in the printed circuit board.

The nozzles 42 are mounted on a carriage K for vertical movement between upper and a lower position relative to the fixtures C, as will be more fully described hereinafter, to locate terminals supported therein above the bushings D of the fixture C, when the nozzles are in their lower position, and to release the terminals, whereupon they will drop into the bushings, during movement of the nozzles toward their upper position. The entire operation may be automatic and may be coordinated with a punching operation for staking the terminal heads to assemble the terminals and board whereby actuation of the punch will effect the automatic initiation and termination of a complete cycle of operation of the machine and a subsequent advance of the chain conveyor B.

Turning now to a specific description of the portions of the machine generally described above, the supply portion E is supported on a plate 31 supported above the table A and comprises the turntable 30, a pair of take-up reels 44 and 46, a motor 48 for driving the take-up reels through a belt 50, and stripping rollers 51, 52 mounted adjacent the guide channel F. In the operation of this portion of the machine, the free end of the coil of terminals is threaded into the guide channel F. The spacer members 26 and 28 are manually separated from the coil as it is initially unwound and led along a guide rail 53 where they may drop off the plate 70. The flexible strips 22, 24 are removed from the end of the coil and led around the rollers 51, 52, respectively, and into engagement with the take-up reels 44, 46. It should thus be apparent that as the take-up reels 44, 46 are rotated, the terminals will be advanced through the guide channel F while at the same time the strips 22, 24 will be removed from the terminals prior to their entry into the lower portion 32 of the guide channel. As can be seen from Fig. 2, the upper and lower portions of the guide channel F form, in effect, a pair of aligned channels with the rollers 51, 52 being disposed at the exit end of the first channel formed by the upper portion of the guide channel F.

The movement of the terminals through the guide channel F is limited by engagement of the end terminal with the slide 34 mentioned above and, as will be hereinafter seen, inasmuch as the movement of the terminals through the guide channel is not continuous, it is desirable and preferable to provide a yieldable drive 35 between the belt 50 and the take-up reels 44, 46 which may be of any suitable type and which will permit the motor 48 to be continuously operated, and assure that the lower portion 32 of the guide channel will be maintained filled with stripped terminals. It is also preferable that the turnable 30 incorporate means 39 of a suitable type to frictionally impede rotation of the turntable in order to preclude backlash of the coil.

With reference to Figs. 1 to 4, the slide 34 of the terminal selecting portion G is mounted for longitudinal sliding movement effected by means of an air motor 54 having a piston rod 56 connected to the slide by a bar 58. The slide is limited in its rightward movement as viewed in Figs. 1 and 2 by a stop member 60 removably mounted in one of a plurality of apertures 62 in the plate 31 by the screw 64. The apertures 62 correspond in number and spacing to the notches 36 in the slide so that with the stop member disposed in the leftwardmost aperture 62 only one terminal will be picked up by the slide upon its leftward return movement. Thus the position of the stop member 60 determines the number of terminals to be picked up by the slide, which number may be varied, as desired, for any particular application.

The slide 34, as most clearly seen in Fig. 3, is slidably mounted in a recess 66 of a front rail 68 which in turn is mounted on a plate 70 spaced above the plate 31. A front rail cover 72 retains the slide 34 and front rail 68 in assembled relation. Also mounted on the plate 70 rearwardly of the front rail 68 is a back rail 74 having a recessed portion 76 in which is slidably received a gate 78. As can be seen in Fig. 4 the gate is provided with elongated diagonally extending apertures such as 80 in which is received a pin 82 mounted on the back rail 74. A spring 86 is engaged at one end in a recess 88 at each end of the gate member and at the other end in a recess 90 in the back rail 74 to normally urge the gate in a forward direction toward the slide 34. A bell crank 92 is pivotally mounted as at 94 on the back rail 74 and is engageable at one end in a recess 96 in the gate and at the other end as shown in Fig. 2 with a plunger 98 of an actuating element 100 whereby movement of the bell crank in a clockwise direction, as viewed in Fig. 4 will move the gate in a rearward direction against the force of the springs 86. The back rail cover 84 retains the gate and back rail in assembled condition and is provided with a plurality of semi-circular notches or recesses as at 85 which are in registry with the passageway 102 formed by recesses as at 69 and 75 in the back and front rails, respectively, and an aperture as at 71 in the plate 70.

From a consideration of Fig. 5, it should be apparent that when the slide is moved to the right as viewed in Figs. 2 and 5, the notches in the slide will pass by the end terminal in the stacked row of terminals in the lower guide channel 32 but will then be prevented from picking up and carrying any terminals inasmuch as any terminal received in the notches as they pass by the end of the lower guide channel 32 will be cammed out of the notches and back into the guide channel by the inclined trailing edge 37 of the notches 36. When the slide 34 is moved to the left, however, the end terminal in the channel 32 will be engaged by the leading edge portions of the notches 36 and will be carried with the slide into registry with one of the recesses 85 and passages 102. The leading edge portions of the notches 36 are comprised of a shoulder 36a extending in alignment with the path of the slide 34 and a second shoulder 36b extending perpendicularly thereto whereby a lug or terminal having a rectangular cross section will, as is shown in Fig. 5, be transported by the slide in a predetermined position relative thereto to preclude jamming of the lug between the slide and gate.

In order to provide a fully automatic machine, an electrical switch 104 is mounted on the stop member 60 and has a plunger 105 engaged by the slide 34 at the completion of its movement to the right, to actuate a control element 106 mounted on the air motor 54 and effect reversal of movement of the piston 56 and thus the slide 34. Further, a switch 108 having a plunger 109 is preferably mounted on the plate 70 for engagement of the plunger with the slide 34 upon movement of the slide into and out of the limit of its leftward travel for a purpose to be hereinafter described.

As most clearly seen in Figs. 1 and 3, mounted beneath the plate member 70 and extending through the supporting plate 31 is a manifold 110 having a plurality of apertures such as 112 in registry with the apertures 71 in the plate member 70 and thus the passages 102. The apertures 112 are each provided with an enlarged portion as at 114 in Fig. 3 for the reception of a connector 116. The connector 116 is provided with a bore 118 of substantially the same diameter as the aperture 112 in the manifold and a setscrew 120 is provided to maintain the connector in the manifold. The bore 118 of the connector 116 is provided with an enlarged portion 119 in which is threadably received a coil spring 122 which encloses the tube 40 to provide a means for retaining one end of a tube within the connector 116, and further to provide a support for the tube 40 over its entire length.

To assure that the terminals will not hang up in the notches 36 of the slide, an ejector 103 is slidably mounted on the front rail cover 72, as shown in Fig. 3, by means of an elongated slot 107 in the ejector which is slidably engaged with a mounting screw 111 on the front rail cover. The ejector is provided with a post or lug 113 to which is engaged one end of a coil spring 115, the other end of which is engaged with a post or lug 117 mounted on the back rail cover 84. The spring 115 is preferably installed under slight tension whereby the ejector will be biased in a rearward direction toward the back rail cover. The ejector 103 is provided with a camming edge 121 which is engageable by the leading terminal being moved leftwardly by the slide 34 to move the ejector forwardly to the position shown in Fig. 3, whereupon the rearwardly extending lip 123 provided on the ejector engages the head 14 of a terminal carried by the slide. Upon actuation of the gate 78, the ejector 103 will be permitted to move to the left or rearwardly as viewed in Fig. 3 by the spring 115 to eject the terminal 10 from the notch 36 in the slide member whereupon it will fall into the tube 40.

With reference to Figs. 1 and 6–8, the other end of the tube 40 is retained within a connector 124 in a manner similar to that described in connection with the connector 116. The connector 124 is clampingly received in a spring clamp 126 mounted on a pattern plate 128 to be more fully hereinafter described. The connector 124 is provided with a bore, to permit passage of a terminal therethrough into one end of the nozzle 42. The nozzle 42 is supported in an aperture 130 in the pattern plate 128 by means of a pair of spring clamps 132, 134 each having one end portion as at 136 as shown in Fig. 8 which is supportingly engaged in a notch 138 in the nozzle 42, an intermediate recessed portion 140 which is engaged with a portion of the periphery of the aperture 130, and another end portion 142 resiliently engaging the upper end of the nozzle 42. The nozzle 42 is comprised of nozzle portions 144 and 146 which, when assembled, provide a nozzle having a generally rectangular cross section. The mating edges of the nozzle portions 144 and 146 are each angularly relieved as at 148 whereby, as shown in Fig. 6, the spring members 132, 134 will normally urge the nozzle portions into a non-parallel relationship with the lower end portions 150, 152 of the nozzle spaced apart. The lower ends 150, 152 of the nozzle portions are each provided with a semi-cylindrical chamfered surface 154 from which extends a tapered semi-cylindrical nose 156. The lower ends of the nozzle portions, as can be seen in Figs. 6 and 8, extend through circular apertures 158 in a lower pattern plate 160, which as will be later seen, is during a portion of the operating cycle of the machine moved relative to the upper pattern plate member 128, whereby, as shown in Fig. 8, the periphery of the aperture 158 will engage the chamfered surface 154 of the nozzle to move the noses 156 into engagement and to space the relieved portions 148 of the upper end of the nozzle portions.

Figure 15:
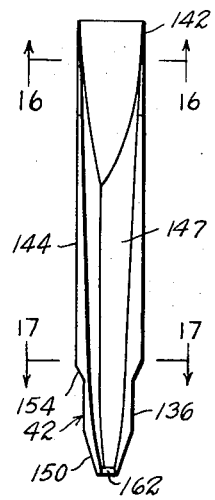
Fig. 15 is an elevational view of a nozzle of the machine.
Figure 16:
Fig. 16 is a cross sectional view along the lines 16—16 of Fig. 15.
Figure 17:
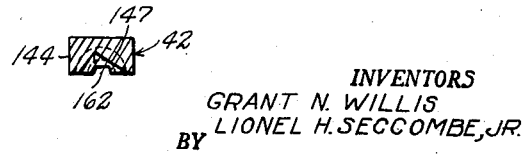
Fig. 17 is a cross sectional view along the lines 17—17 of Fig. 15.

The nozzle portions 144, 146 are each provided with a recess 147 extending longitudinally thereof. As shown in Figs. 15 to 17, the recesses 147 have a semicircular cross section adjacent the upper end 142 of the nozzle which, when the portions 144, 146 are assembled, form a substantially circular aperture for receiving the end of the tube 40. Each recess 147 has a V-shaped cross section adjacent the lower end 136 of the nozzle portion and, as can be seen from Figs. 15 and 17, the axis of the V-shaped portion of the recess 147 is displaced from the longitudinal axis of the nozzle portion and the recess is tapered longitudinally toward the nose of the nozzle where it terminates in a rectangular recess 162 through which the stem 12 of a terminal 10 may protrude when the terminal is suspended by the nozzle. It should be apparent that the configuration of the recess 147 is such that when the nozzle portions are assembled and relatively positioned as shown in Fig. 8, the recesses 147 will form a bore extending longitudinally through the nozzle, which will assure that regardless of the relative disposition of the terminal when it enters the upper portion of the nozzle, the terminal will be turned about its longitudinal axis during its travel through the bore in a predetermined manner to assure that it is positioned properly for reception of the stem of the terminal in the rectangular opening in the end of the nose. As should further be apparent, with the nozzle portions in the relative position shown in Fig. 8, the terminal will be suspended by the nozzle until such time as the nozzle portions are moved to the relative position shown in Fig. 6 whereupon the terminal may fall from the nozzle.

It has been found in the practice of the invention that as a terminal drops from the nozzle 42, it will, because of the configuration of the bore of the nozzle, be turned slightly about its longitudinal axis. Therefore, in order to provide proper registry of the terminal with the bushing D of the fixture C, the nozzles 42 are mounted on the upper plate member 128 such that the longitudinal axis of the rectangular aperture 162 in the nose of the nozzle is angularly displaced from the centerline of the pattern plate 128 a predetermined amount, as shown in Fig. 7, to assure that as the terminal is dropped from the nozzle the stem 12 thereof will fall freely into the bushing.

With particular reference to Figs. 1, 6 and 7, the upper pattern plate 128 and lower pattern plate 160 are carried on carrier members or platforms 164, 166, respectively. The upper pattern plate 128 rests on the sides 168, 170 of the platform 164 and is provided with recesses 172 at each side thereof. A thumb screw 176 is engageable in the recess 172 and threadably received in the sides of the platform 164 to retain the pattern plate 128 thereon. A pair of dowels 178, 180 provide locating means for the plate 128 on the platform 164. The lower pattern plate 160 is similarly mounted on the platform 166, but with thumb screws 182 threadably received in the pattern plate and retaining the plate in engagement with the bottom surface of the platform 166 as at 184.

The platforms 164 and 166 are each provided with a pair of bosses 186, 188, respectively, each of which has a throughbore slidably mounted on a pair of supporting columns 190, 192 which are mounted on a bracket 194 which is, in turn, mounted on the side of the table A. As shown in Fig. 6, the platform 166 is provided with a pair of locating dowels 193, which are receivable in a bushing, such as 195, on the fixture C to provide accurate locating of the fixture relative to the pattern plates.

The upper ends of each of the columns are mounted to a cross member 198. An air motor 200 is dependingly mounted from the cross member 198 and is provided with a piston rod 202 having a threaded end 204 engaged with the upper platform 164, as shown in Figs. 6 and 7, whereby the upper plate is movable with the piston 202. A nut 212 adjustably retains the platform 164 and the piston 202 in a preselected relative position.

As seen in Fig. 6, a bolt 206 extends upwardly through the bottom of the lower platform 166 and through an aperture 208 therein coaxially of the air motor piston 202 and the upper end of the bolt is threadably received in at 210 in the upper platform 164. A spring 213 surrounds the bolt 206 and is engaged between the bottom of the aperture 208 and a washer 220 which abuts a lock nut 214 on the bolt 206. A pair of bolts 222 mounted on the bracket 194 limit downward movement of the lower pattern plate.

As should be apparent from the above description, as the piston 202 is moved downwardly, both pattern plates 128 and 160 will be moved together until such time as the lower platform 166 engages the bolts 222, whereupon the upper pattern plate 128 will continue to be moved downwardly until the upper platform 164 engages the top of the bosses 188 of the lower platform, which relative movement of the pattern plates will close the nozzle 42. On subsequent movement of the piston 202 in an upward direction, as viewed in Figs. 1 and 6, the upper pattern plate 128 will initially be moved upwardly relative to the lower pattern plate to the extent permitted by the resilient lost motion connection between the plates to effect opening of the nozzle 42.

Figure 10:
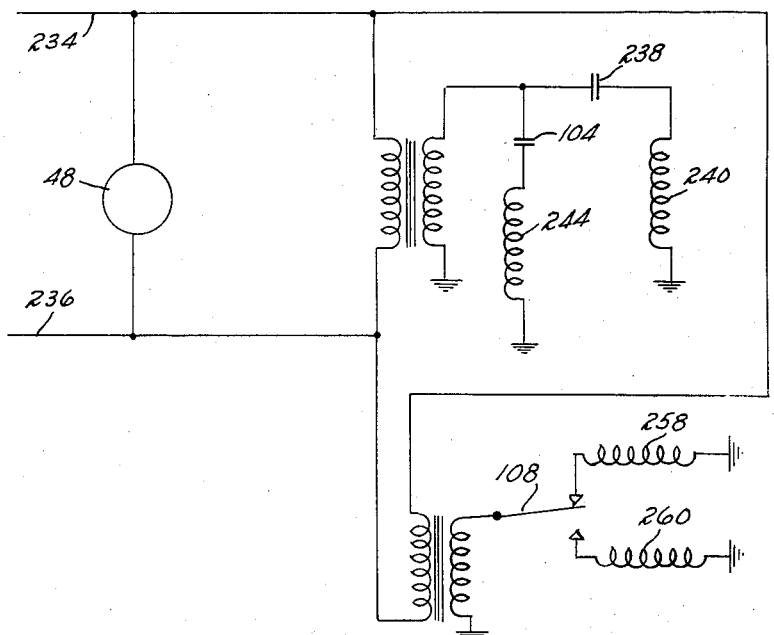
Fig. 10 is a schematic diagram of an exemplary electrical control circuit for the machine.
Figure 11:
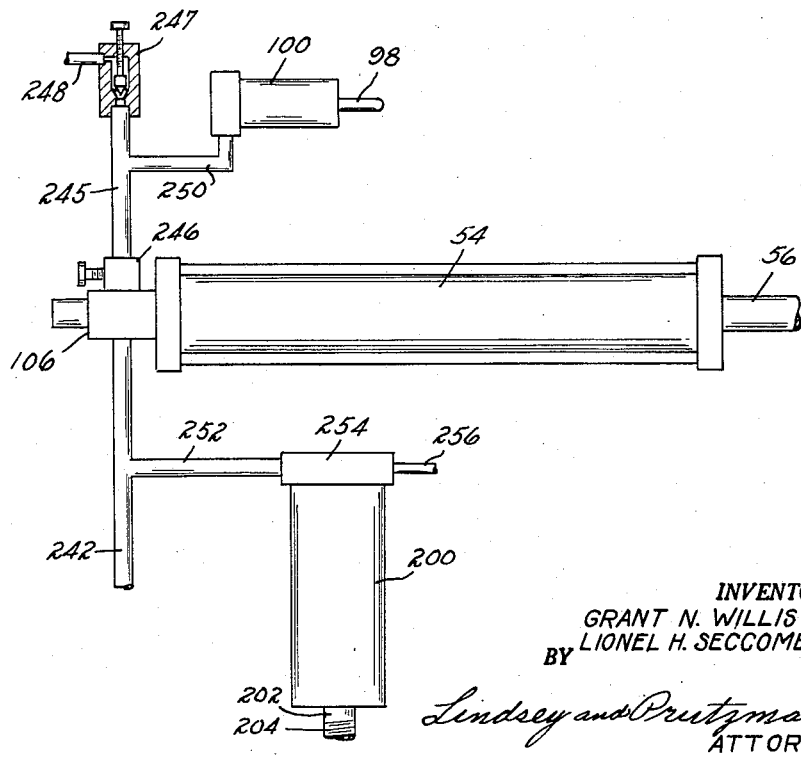
Fig. 11 is a diagrammatic view of an exemplary pneumatic control for the machine.
Figure 12:
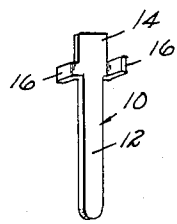
Fig. 12 is a perspective view of one of the contacts of Fig. 9.

It is believed that a cycle of operation of a machine constructed in accordance with the invention will be apparent from the description above along with the following description of Figs. 10 and 11 illustrating schematically the electrical and pneumatic control of the machine. With reference to Fig. 10, lines 234, 236, supply electric power to the motor 48 which drives the take-up reels 44, 46 and further supply electric power to the remainder of the electrical control portion of the machine. A manually controlled switch 238 serves to energize a solenoid 240 disposed within the reversing control element 106, shown in Fig. 11, and which in the specific embodiment is a commercially available four-way valve, to connect high pressure air in line 242 of Fig. 11 to one side of the piston of the air motor 54 to move the piston and, thus, the slide 34 to the right. Upon engagement of the slide at the limit of its rightward travel with the switch 104, as hereinbefore described, solenoid 244 will be energized. The solenoid 244 is also contained within the reversing control element 106 and when energized actuates control element 106 to connect the conduit 242 with the other side of the air motor piston to move the slide 34 leftwardly as viewed in Fig. 1. It is preferred not to exhaust the air on said other side of the air motor piston but rather to retain this air in the motor until the reversing control 106 is again actuated to effect movement of the slide to the right. At this time, the air in the air motor on said other side of the piston is permitted by the reversing control 106 to pass into the conduit 245 leading to the needle valve 247. As is apparent, proper adjustment of the valve 247 will create a back pressure in the conduit 245. This high pressure air in conduit 245 communicates with conduit 250 leading to the gate control element 100 which, in the specific embodiment, is a commercially available air clamp having a spring biased plunger or piston 98. The actuating element 100 will operate to move the plunger 98 thereof to the right only when the air pressure in conduit 250 is above a predetermined value. It is further preferred that a reducing valve 246 be provided on the exhaust of the air motor 54 to selectively control the rate of exhaust. It should be apparent that the needle valve 247 and reducing valve 246 may be selectively relatively adjusted to determine the length of time that the gate 78 remains open.

As the slide 34 moves from its leftward limit position, it will move out of engagement with the plunger 109 of the switch 108 to actuate the switch to energize the solenoid 260 contained within a control portion 254 on the pattern plate air motor 200 to permit high pressure air from conduit 242 to enter the air motor 200 through conduit 252 to effect downward movement of the plunger 202 of the air motor, and accordingly closing of the nozzles 42. As the slide moves into its leftward position it engages the switch 108 to actuate the switch to energize the solenoid 258 also within the control portion 254 to effect upward movement of the plunger 202 and opening of the nozzles 42.

A sequence of an operating cycle of the machine is as follows: the switch 238 is actuated to energize the solenoid 240 of the reversing control 106 to connect the high pressure air line 242 with the air motor to move the slide 34 to the right as viewed in Fig. 2. The reversing control 106 will at the same time connect the exhaust side of the air motor 54 to the lines 245 to actuate the air clamp 100 and open the gate 78 to release any terminals held thereby for passage down the tubes 40 and into the nozzles 42. The movement of the slide out of its leftwardmost position will also result in actuation of the switch 108 to energize the solenoid 260 controlling the air motor 200 to effect movement of the pattern plate downwardly to close the nozzles. The pattern plates are moved downwardly by the air motor 200 at a speed greater than that at which the lugs will fall due to gravity, and thus the lower ends of the nozzles will be closed when the terminals reach them and the nozzles will support the terminals in position for loading into the fixture C.

When the slide reaches its rightwardmost limit of travel as determined by the stop 60, the slide will engage the switch 104 to energize the solenoid 244 to reverse the air motor and drive the slide to the left during which time the slide will pick up the selected number of terminals. When the slide reaches its leftwardmost limit of travel it will reengage the plunger 109 of the switch 108 to actuate the switch to energize the solenoid 258 to actuate the motor 200 and move the pattern plates upwardly to open the nozzles and release the terminals held thereby thus loading the fixture C. The operating cycle may be temporarily halted at this point to permit advancement of the chain D carrying the fixtures C to position a new fixture beneath the nozzle 42. As should be apparent, subsequent actuation of the switch 238 will result in an automatic repetition of the cycle with the lugs picked up by the slide during the last cycle being dropped into the nozzles as the slide is initially moved to the right.

We claim:

1. In a machine for automatically inserting lugs in a panel and the like wherein the lugs are supplied to the machine in an elongated row with adjacent lugs maintained in juxtaposition by a pair of elongated flexible strips removably adhered on opposite sides thereof, means forming a guide channel for the lugs, a pair of guide rollers adjacent either side of the exit of the guide channel and engageable respectively with a portion of each of the strips which has been removed from the lugs, and a pair of rotatable take-up members drivingly engageable with the free ends of said portions of the strips for the advance thereof around around the guide rollers to simultaneously advance said row of lugs and remove the strips therefrom.

2. In a machine for automatically inserting lugs in a panel and the like wherein the lugs are supplied to the machine in an elongated row with adjacent lugs being maintained in juxtaposition by a pair of elongated flexible strips removably adhered on opposite sides thereof, means forming a guide channel for the lugs, a pair of guide rollers adjacent either side of the exit of the guide channel and engageable respectively with the portion of each of the strips which has been removed from the lugs, means forming a second guide channel for the lugs having its entrance aligned with said exit of the first channel, a pair of rotatable take-up members respectively engageable with the free ends of said portions of the strips, and means to yieldably drive said rotatable members to remove the strips from the lugs and simultaneously advance the then free lugs along said second channel.

3. In a machine for inserting in a panel and the like lugs of the type having an elongated stem and a pair of laterally extending angularly related ears wherein said lugs are supplied to the machine in stacked relationship and held together by a pair of flexible strips removably adhered to opposite sides of the stems, a pair of spaced apart guide members forming a channel in which the stems are receivable in an upright position, a pair of guide rollers adjacent the exit of said guide channel and engageable respectively with a portion of each strip which has been removed from the lugs, a second pair of spaced apart guide members forming a second channel having its entrance aligned with and disposed closely adjacent said exit of the first channel, a pair of take-up reels respectively engageable with the free ends of said portions of the strip, and means to yieldably drive said reels.

4. In a machine for inserting lugs in a panel and the like, a turntable, a coil of lugs of the type having an elongated stem carried by the turntable and comprising an elongated row of upright stacked lugs held together by a pair of flexible strips removably adhered to opposite sides of the stems, a pair of spaced apart guide members forming a guide channel in which the free end of said elongated row is receivable with the stems in an upright position, a pair of rollers disposed respectively on opposite sides of and closely adjacent the exit of said channel, a pair of take-up reels respectively associated with said rollers, a second pair of guide members forming a second guide channel aligned with the first, said rollers and take-up reels being engageable with a portion of said strips which has been removed from the lugs, and means to yieldably drive said reels to simultaneously remove the strips from the lugs and advance the then free lugs along said second channel in an upright position.

5. In a machine for automatically inserting lugs in a panel and the like wherein the lugs are supplied in an elongated stacked row with adjacent lugs maintained in juxtaposition by a pair of removable strips adhered thereto on opposite sides, a guide channel for the lugs, means to automatically remove said strips for the lugs and yieldably advance the then free lugs along said channel, and a reciprocable slide engageable with the end lug in the exit end of said channel to impede advance of the lugs and having a plurality of recesses along one edge thereof for receiving lugs during movement of the slide.

6. A machine as described in claim 5 wherein each said recess has an inclined trailing edge engageable with the end lug during movement of the slide in one direction to preclude release of the end lugs into the recesses during movement of the slide in said one direction.

7. A machine as described in claim 6 wherein each of said recesses is provided with an edge opposite said trailing edge having shoulder means engageable with a lug to orient the lug in a predetermined position relative to the path of movement of said slide during movement of the slide in a direction opposite said one direction.

8. A machine as described in claim 7 wherein said shoulder means comprises a shoulder extending transversely of the path of movement of the slide from said one edge of the slide and a second shoulder extending from the inner end of the first shoulder in alignment with the path of movement of the slide.

9. In a machine for automatically inserting lugs in a panel and the like, means providing an elongated row of stacked lugs, means forming a plurality of lug delivery stations, carrier means to move a predetermined number of end lugs from said row into respective registry with said delivery stations, means to automatically effect disengagement of the lugs and carrier means in response to movement of the carrier means, a plurality of conduits respectively communicating at one end with said delivery stations for the passage of lugs disengaged from said carrier means, a plurality of lug orienting and inserting members communicating with the other end of said conduits, said orienting and inserting members being supportingly engageable with a lug, means for releasing a lug from said orienting and inserting members in response to movement thereof relative to said carrier means, and means to move the orienting and inserting members relative to the carrier means in response to movement of said carrier means.

10. In a machine for automatically inserting lugs in a panel and the like, means to automatically transport a lug from a supply to a delivery station and to automatically effect disengagement of the lug and transport means, and lug orienting and inserting means communicating with said delivery station comprising a pair of relatively movable members, a nozzle carried by one of said members supportingly engageable with a lug and adapted to release a lug in response to relative movement of said members, and means to provide relative movement of said members in response to movement of the transporting means.

11. In a machine for automatically inserting lugs in a panel and the like of the type having means to automatically transport a lug from a supply to a delivery station and to automatically effect disengagement of the lug and transport means when said lug and delivery station are in registry, lug orienting and inserting means communicating with said delivery station and comprising a pair of movable plate members, a resilient lost motion connection between said plate members, a nozzle member comprised of a plurality of sections, said sections being movable relative to each other between two positions, one of which being a lug supporting position and the other being a lug releasing position, means mounting said nozzle on one of said plate members and urging said sections into one of said two positions, and means on the other of said plate members engageable with said sections during relative movement of the plate members to move said sections into the other of said two positions.

12. In a machine for automatically inserting lugs in a panel and the like of the type having means to automatically transport a lug from a supply to a delivery station and to effect disengagement of the lug and transport means when said lug and delivery station are in registry, lug orienting and inserting means communicating with said delivery station comprising a pair of relatively movable plate members, an elongated nozzle member supportingly engageable with a lug and adapted to release a lug in response to relative movement of said plate members, and means to provide relative movement of the plate members in response to movement of the transporting means, said nozzle member being provided with a longitudinal lug receivable bore having a cross sectional and longitudinal configuration to provide a predetermined rotation of a lug about its longitudinal axis and relative to the nozzle member as the lug passes through the nozzle.

13. In a machine for automatically inserting lugs in a panel and the like of the type having means to automatically transport a lug from a supply to a delivery station and to effect disengagement of the lug and transport means when said lug and delivery station are in registry, lug orienting and inserting means communicating with said delivery station comprising a pair of relatively movable plate members, an elongated nozzle member supportingly engageable with a lug and adapted to release a lug in response to relative movement of said plate members, and means to automatically provide relative movement of the plate members, said nozzle member being provided with a longitudinal lug receiving bore in one end of which a lug is adapted to be supported in predetermined relation to a panel and the like, said one end of the bore having a longitudinal and lateral cross section constructed to provide a predetermined rotation of a lug about its longitudinal axis and relative to said nozzle member during release of the lug therefrom.

14. A lug inserting and orienting nozzle for a machine for automatically inserting a lug in a panel and the like comprising a plurality of elongated sections, each section being provided with a recess extending longitudinally thereof to form a lug orienting and supporting passage through the nozzle when the sections are assembled, a mating surface extending longitudinally of each section engageable with a corresponding surface on an adjacent section, one end of said mating surface being angularly related to the remainder thereof, and means adjacent and integral with the other end of each section adapted for engagement by a member movable relative to the nozzle to move the sections relative to each other to effect engagement of said remainder of the mating surfaces.

References Cited in the file of this patent

UNITED STATES PATENTS

| | | |
|---|---|---|
| 2,470,795 | Socke | May 24, 1949 |
| 2,502,227 | Makenny | Mar. 28, 1950 |
| 2,713,930 | Kock | July 26, 1955 |
| 2,733,564 | Russell et al. | Feb. 7, 1956 |